Jan. 9, 1951  C. M. MOTTE  2,537,479
COMBINED SUSPENSION HUB AND SHOCK
ABSORBER FOR VEHICLE WHEELS
Filed Aug. 6, 1947  3 Sheets-Sheet 1

Jan. 9, 1951

C. M. MOTTE 2,537,479

COMBINED SUSPENSION HUB AND SHOCK
ABSORBER FOR VEHICLE WHEELS

Filed Aug. 6, 1947

Jan. 9, 1951
C. M. MOTTE
2,537,479
COMBINED SUSPENSION HUB AND SHOCK ABSORBER FOR VEHICLE WHEELS
Filed Aug. 6, 1947
3 Sheets-Sheet 3
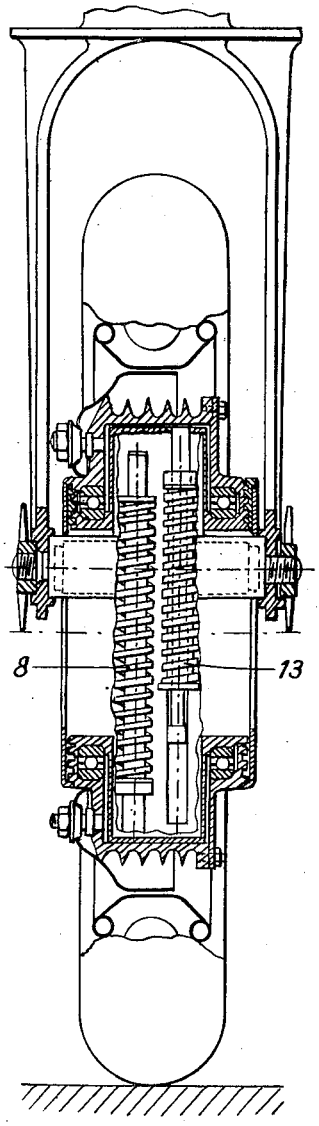
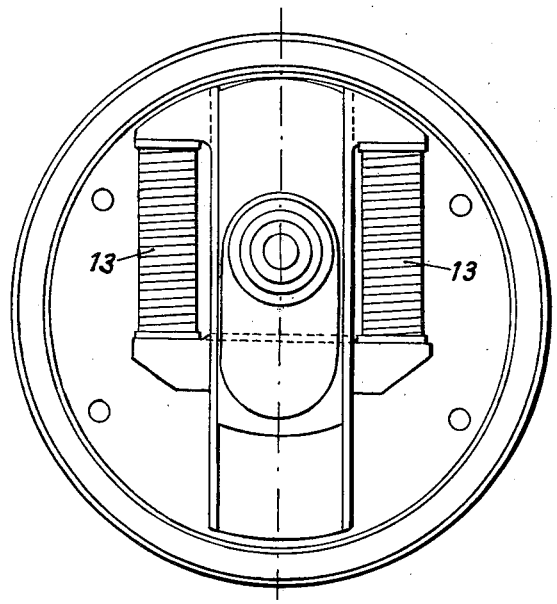

Patented Jan. 9, 1951

2,537,479

UNITED STATES PATENT OFFICE 2,537,479

COMBINED SUSPENSION HUB AND SHOCK ABSORBER FOR VEHICLE WHEELS

Charles Marius Motte, Paris, France

Application August 6, 1947, Serial No. 766,781
In France February 12, 1946

Section 1, Public Law 690, August 8, 1946
Patent expires February 12, 1966

4 Claims. (Cl. 301—136)

In the present day vehicle suspensions, the two front or rear wheels rotate on the journals of the same axle which is connected to the chassis by means of springs.

Consequently, if one of the wheels is lifted, the axle bears on the other wheel and forms a lever and lifts the vehicle.

On the other hand, in the case of an automobile or truck, as the back axle is very heavy, its inertia produces violent reactions, on the one hand on the vehicle which is thus subjected to shocks, and on the other hand on the tyres which undergo rapid wear.

Attempts have been made to make the four wheels independent by connecting each wheel to the chassis by means of more or less complicated suspension devices, by using leaf springs, torsion bars, etc., but the complication is quite unsatisfactory.

The present invention relates to a suspension device which makes the wheels independent and which, in addition to the general advantages of this arrangement, also has those of completely enclosing the springs, of lubricating them and of making it impossible in any case for the wheels to become separated from the chassis.

The device according to the invention essentially consists in the fact that it combines, in one and the same flat case which is concentric to the wheel, coil springs which are located on either side of the axle, one part of the springs fulfilling the functions of a suspension, the other part fulfilling the function of shock-absorbers, said springs being located between a stirrup or bridge secured to the rim of the wheel and a stirrup or bridge secured to the axle.

The whole arrangement is completed by suitable guide means and also by a mechanical transmission device for the driving wheel. In order to give a concrete idea of the invention, some embodiments thereof have been illustrated in the accompanying drawings in which:

Figs. 6 and 7 are sectional views respectively taken along the lines E—E and F—F of Fig. 5.

Fig. 9 is a sectional view of the suspension device applied to a steering wheel mounted on a fork.

Figure 1:
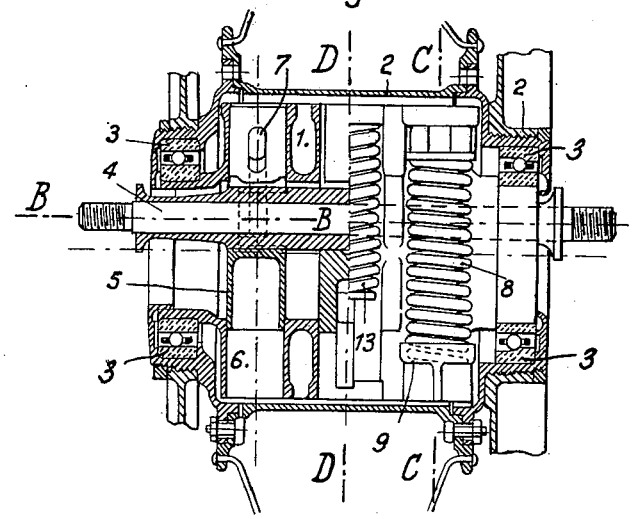
Fig. 1 is a half front elevational view and half sectional view taken along the line A—A of Fig. 2.
Figure 2:
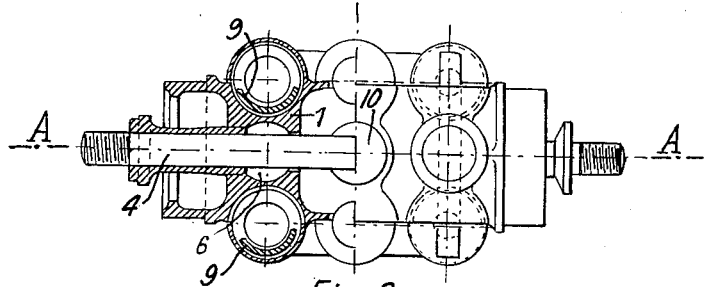
Fig. 2 is a half plan view and half sectional view taken along the line B—B of Fig. 1.
Figure 3:
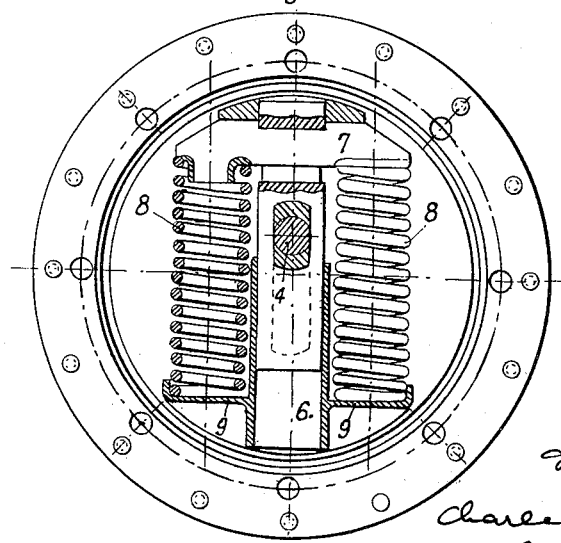
Figs. 3 and 4 are sectional views respectively taken along the lines C—C and D—D of Fig. 1.
Figure 4:
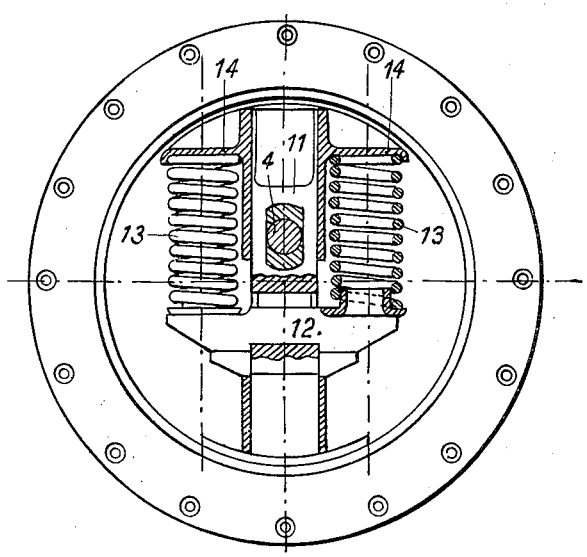

The device shown in Figs. 1 to 4 comprises a central member 1, upon which is mounted a hollow casing or hub body 2, supported by anti-friction bearings 3. Within member 1, is mounted an axle 4 which is vertically displaceable, and in order to guide this axle in movement, it is disposed between vertical slides 5, which are substantially parallel to the bores 6 in member 1. The slides 5 are provided with a cross-piece or stirrup 7, which is disposed on the springs 8, the latter resting at their opposite extremities on the laterally projecting supporting stirrup portions 9, integral with member 1.

The mentioned central member 1, furthermore, has another central bore 10 in which a slide 11 substantially carried by axle 4 is movable parallel to slides 5 and has at its lower portion a cross-piece or stirrup 12 serving to support springs 13 which are disposed between this stirrup 12 and the guide faces or supports 14 integral with member 1 similarly to stirrup portions 9.

Springs 8 thus play the role of return springs, while springs 13 play the opposite part of damping springs, so that, in other words, both series of springs 8 and 13 operate in mutually opposite directions.

The springs 8 are the suspension springs and the springs 13 are the shock-absorbing springs; in these conditions, it will be understood that said springs are interposed between a stirrup 9 or 14 secured to the rim of the wheel and a stirrup 7 or 12 secured to the axle and that the relative movements of the wheel and the axle are effected by the sliding of the stirrup in the guides, said movements causing the stirrups to move towards or away from one another by compressing the springs or allowing them to expand according to the direction of the movements.

As will be realized by inspecting the drawings, the amplitude of the movements may be fairly large owing to the length of the springs which extend over the entire height of the case and which are consequently very flexible.

Figure 5:
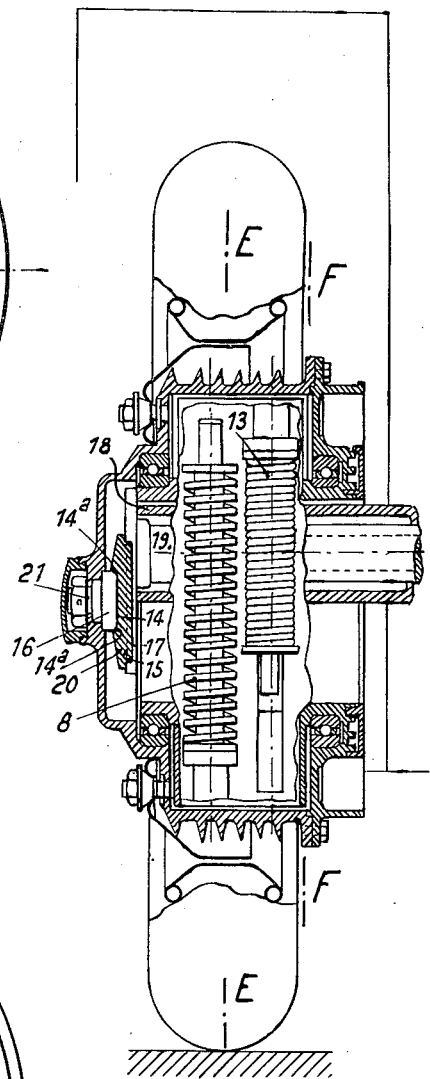
Fig. 5 is a sectional view of the device applied to a driving wheel of an automobile vehicle.

Fig. 5 shows an entire driving wheel in accordance with my present invention. The arrangement of the casing, the stirrups and the springs is similar to the arrangement described above.

Figure 8:
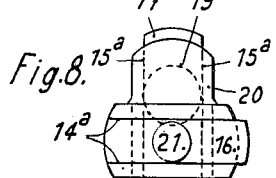
Fig. 8 shows an elevation of the member with two guideways which effects the transmission of movement between the drive shaft and the driven wheel.
Figure 6:
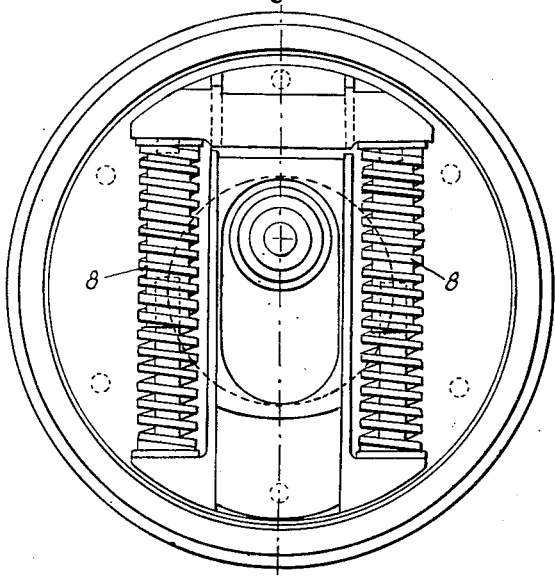

The axle 18 is hollow, and the drive shaft 19 passes through it. This drive shaft 19 actuates the driving wheel by means of a transmission device which is constructed in the following manner:

To the end face of drive shaft 19, shown in Figs. 5 and 8, a slider 17 is secured. This slide 17 slides in a groove 15 provided in the block member 20. Proper guiding of the slider 17 in groove 15 is ensured by means of the projecting parallel guiding faces 15a.

The block 20 is provided on its outer face with another groove 14, arranged normal to the first mentioned groove 15. This groove 14 is limited on both sides by parallel guiding faces 14, which are arranged normal to the guiding faces 15a of groove 15.

In this groove 15 a slider 16 is slidably arranged. This slider 16 is firmly secured to the driving shaft 21 of the wheel, adapted to rotate the same.

In the case in which these hubs are mounted on an existing axle and vehicle with leaf springs as usual, the wheels are nevertheless independent of one another, a part of their movement, when passing over uneven parts of the ground, being effected before the axle has been subjected to a reaction and effected an appreciable movement.

In these conditions, the springs can be so calculated that the suspension systems belonging to each wheel absorb the shocks due to the small differences of level of the ground and the springs only operate for movements of large amplitude.

With the hub according to the invention, if one wheel moves owing to a difference of level of the ground, the three other wheels are not affected by this movement. The vehicle retains three bearing points in the same plane and is not subjected to vertical reactions. Consequently, this system of suspension has the advantage of considerably decreasing the oscillations or vibrations of the chassis and of increasing the road holding properties of the vehicle.

The foregoing arrangements are only given by way of example, it being possible for the arrangements of details to vary in any case without altering the characteristics of the invention, in particular the number of springs, both suspension springs and shock-absorbing springs, may vary according to the loads to be supported in each particular case of use.

What I claim is:

1. A resilient hub for a vehicle wheel and an axle, which comprises a case, an axle guiding support concentrically mounted on said case, said support being provided with bores, guide pistons secured to the axle and slidably mounted in said bores, at least one pair of suspension springs mounted between a stirrup secured to one of the guide pistons and a rest provided in the guiding support, and at least one pair of shock-absorbing springs mounted in opposition relatively to the suspension springs between a rest provided in the guiding support and a stirrup secured to another of the guide pistons.

2. A resilient suspension hub for a vehicle wheel and an axle, which comprises a case, an axle guiding support concentrically mounted on said case, said support being provided with bores, guide pistons secured to the axle and slidably mounted in said bores, at least one pair of suspension springs mounted between a stirrup secured to one of the guide pistons and a rest provided in the guiding support, and a pair of shock-absorbing springs mounted in opposition relatively to the suspension springs between a rest provided in the guiding support and a stirrup secured to another of the guide pistons, the stirrups respectively relating to the pair of suspension springs and to the pair of shock-absorbing springs being cross-mounted.

3. A resilient hub for a vehicle wheel and an axle, which comprises a case, a drive shaft, an axle guiding support concentrically mounted on said case, said support being provided with bores, guide pistons secured to the axle and slidably mounted in said bores, at least one pair of suspension springs mounted between a stirrup secured to one of the guide pistons and a rest provided in the guiding support, at least one pair of shock-absorbing springs mounted in opposition relatively to the suspension springs between a rest provided in the guiding support and a stirrup secured to another of the guide pistons and a mechanical transmission member provided with a double guideway interposed between the drive shaft and the case of the wheel.

4. A resilient hub for a vehicle driving wheel and an axle, which comprises a case, a drive shaft, an axle guiding support concentrically mounted on said case, said support being provided with bores, guide pistons secured to the axle and slidably mounted in said bores, a pair of suspension springs mounted between a stirrup secured to one of the guide pistons and a rest provided in the guiding support, a pair of shock-absorbing springs mounted in opposition relatively to the suspension springs between a rest provided in the guiding support and a stirrup secured to another of the guide pistons, the stirrups respectively relating to the pair of suspension springs and to the pair of shock-absorbing springs being cross-mounted, and a mechanical transmission member provided with a double guideway interposed between the drive shaft and the case of the wheel.

CHARLES MARIUS MOTTE.

REFERENCES CITED

The following references are of record in the file of this patent:

UNITED STATES PATENTS

| Number | Name | Date |
| --- | --- | --- |
| 1,163,510 | Cornfield | Dec. 7, 1915 |
| 2,241,217 | Peters | May 6, 1941 |